United States Patent [19]

Wrzesinski

[11] 3,853,727

[45] Dec. 10, 1974

[54] SPRAYABLE PHOTOCURABLE SURFACE COATING COMPOSITION

[75] Inventor: Joseph Francis Wrzesinski, Baltimore, Md.

[73] Assignee: W. R. Grace & Co., New York, N.Y.

[22] Filed: Oct. 15, 1973

[21] Appl. No.: 406,269

Related U.S. Application Data

[63] Continuation-in-part of Ser. No. 276,287, July 31, 1972, abandoned.

[52] U.S. Cl. ........ 204/159.18, 96/115 P, 117/93.31, 117/148, 117/132 B, 117/132 R, 204/159.14, 204/159.15, 204/159.23, 204/159.24, 260/23 R, 260/23 TN, 260/28, 260/28.5 R, 260/24.1 B, 260/29.75 Q, 260/29.7 H, 260/42.29, 20/77.5 AP, 260/77.5 R, 260/79, 260/79.5 CN, 260/79.5 NV, 260/836, 260/837 R

[51] Int. Cl. ............................ C08d 1/00, C08f 1/00

[58] Field of Search..... 204/159.14, 159.18, 159.23, 204/159.15; 260/28 R, 28.5 R, 29.7, 29.2

[56] References Cited

UNITED STATES PATENTS 3,328,325  6/1967  Zdanowski.......................... 260/22

3,661,744  5/1972  Kehr et al. ..................... 204/159.14

Primary Examiner—Paul Lieberman
Assistant Examiner—Richard B. Turer
Attorney, Agent, or Firm—Elton Fisher; Kenneth E. Prince

[57] ABSTRACT

A sprayable photocurable surface coating composition consisting essentially of; (a) 1 part of a polyene having at least two unsaturated carbon-to-carbon bonds per molecule; (b) about 0.2–1 part of a nonionic emulsifier; (c) about 1–50 parts of water; (d) about 0.1–2 parts of carnauba wax, paraffin wax, or a mixture thereof (e) about 0.05–0.25 parts of a photocuring rate accelerator; (f) about 0.1–2 part of glycerol; (g) about 0.1–2 parts of paraffin oil; and (h) a polythiol component containing at least two thiol groups per molecule, the polythiol component being present in an amount to provide about 0.06–1.1 equivalent of polythiol per equivalent of the polyfunctional component, the total functionality of polyene plus polythiol being greater than four.

10 Claims, No Drawings

SPRAYABLE PHOTOCURABLE SURFACE COATING COMPOSITION

CROSS REFERENCE TO RELATED APPLICATIONS

This is a continuation-in-part of my copending application Ser. No. 276,287 filed July 31, 1972, and now abandoned.

BACKGROUND OF THE INVENTION

This invention is in the field of sprayable surface coating compositions. More particularly it is in the field of sprayable photocurable compositions useful for protecting metal, wooden and other surfaces and for polishing and improving the appearance of such surfaces including the surfaces of furniture.

Compositions for polishing and protecting surfaces as well known to those skilled in the art.

The composition of this invention differs from those of the prior art in that it is a sprayable photocurable composition comprising an aqueous dispersion having therein a polyene containing at least two reactive ethylenically unsaturated carbon-to-carbon bonds per molecule and a polythiol component having molecules containing at least two thiol groups per molecule, the total functionality of the polyfunctional component and the polythiol being greater than 4, the polyene (polyfunctional component) and the polythiol reacting in the presence of actinic light to produce a strong hard solid which adheres strongly to a surface on which the uncured composition has been sprayed. Sunlight or any actinic radiation having a wave length of about 3,000–4,000 A can be used to cure the sprayable photocurable composition of this invention.

A film of the composition of this invention which will have a thickness of about 0.01–0.5 mil after curing is rapidly cured when exposed to actinic light. On curing it forms a hard solid coating which adheres firmly to the surface on which it was cured. Said compositions can be applied to a surface by spraying or by other means such as wiping on with a cloth or brush or applying and spreading with a doctor blade.

SUMMARY OF THE INVENTION

In summary, this invention is directed to a sprayable photocurable surface coating composition consisting essentially of:

a. 1 part of a polyene having the formula

R—(CH₂—CH=CH₂)ₙ;

R—(O-CH₂—CH=CH₂)ₙ;

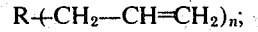 ; or

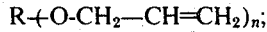 ;

in which
i. R is a hydrocarbyl radical having about 7–100 (preferably about 8–60) Carbon atoms;
ii. E is hydrogen or —CH₂—CH=CH₂; and
iii. n is an integer from 2 to 9;

b. about 0.2–1 part of a nonionic emulsifier;

c. about 0.1–2 parts of a wax selected from the group consisting of carnauba wax, a paraffin wax melting at about 43°–68°C., or a mixture thereof;

d. about 1–50 parts of water;

e. about 0.1–2 parts of glycerol;

f. about 0.1–2 parts of a paraffin oil having a specific gravity of about 0.83–0.9 at 20—C and a viscosity of about 500–1,000 centipoises at 20°C;

g. a quantity of a liquid polythiol having the formula

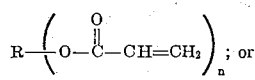 ; or

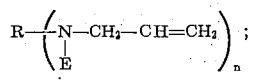

in which;
i. R₂ is a hydrocarbyl radical having about 2–50 (preferably 5–30) carbon atoms;
ii. x is an integer from 0 to 9; and
iii. Y is an integer from 2 to 5 to provide about 0.6–1.1 (preferable about 0.8–1.1 or 0.8–0.95) equivalents of polythiol per equivalent of the polyene, the total functionality of the polyene and the polythiol being greater than 4; and b. 0.05–0.25 (preferable 0.05–0.1, or 0.05–0.2 or 0.06–0.1) part of a photocuring rate accelerator.

DESCRIPTION OF THE PREFERRED EMBODIMENTS

In preferred embodiments of the sprayable photocurable surface coating composition of the above Summary:

1. The photocuring rate accelerator is selected from the group consisting of an aryl aldehyde, a diaryl ketone, a dialkyl ketone, an alkyl aryl ketone, a triaryl phosphine, and a blend of carbon tetrahalide with a polynuclear aromatic hydrocarbon.

2. The photocuring rate accelerator is benzophenone.

3. The polythiol is pentaerythritol tetrakis (β-mercaptopropionate).

4. The nonionic emulsifier is polyoxypropylene-polyoxyethylene emulsifier (which can be prepared by the reaction of ethylene oxide with a polypropylene glycol).

5. The wax is caranauba wax.

6. The wax is paraffin wax.

7. The wax is a mixture of caranauba wax and paraffin wax (more preferably about equal parts of each by weight).

8. The polyene is

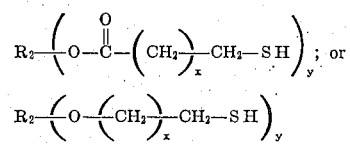

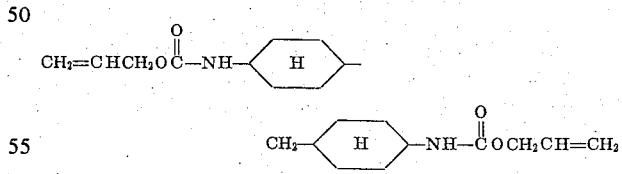

(which can be formed by the reaction of a mole 4,4'-dicyclohexylmethane diisocyanate

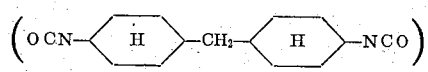

with two moles of allyl alcohol—both of which are articles of commerce)

The polyene is

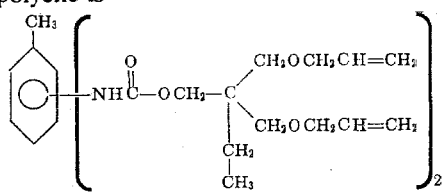

(which can be made by the reaction of a mole of toluene diisocyanate with 2 moles of the diallyl ether of trimethylol propane—both toluene diisocyanate and said diallyl ether being articles of commerce).

DETAILED DESCRIPTION OF THE INVENTION

It is an object of this invention to provide a sprayable photocurable surface coating composition useful for protecting and improving the appearance of metal and wooden surfaces including painted surfaces.

It is object of this invention to provide a photocurable composition useful for protecting surfaces and for improving the appearance thereof which can be applied by spraying either with conventional spraying means or by the aerosol bomb technique.

It is another object of this invention to provide a composition for protecting and improving the appearance of surfaces—especially painted and unpainted metal surfaces—which can be applied by spraying a film (which will cure to yield a cured coating about 0.01–0.5 or 1 mil thick) of said composition on such surfaces. Said film can be cured in a period of about 1–30 minutes by exposure to sunlight or other actinic radiation having a wave length of about 3,000–4,000 A.

Still other objects will be readily apparent to those skilled in the art.

These and other objects have been attained by: (1) basing the photocurable polishing wax on a photocurable composition ("Composition A") consisting essentially of; (a) 1 part of a liquid polyene (polyfunctional compound) containing at least two reactive ethylenically unsaturated carbon-to-carbon bonds per molecule; (b) a quantity of a liquid polythiol component having molecules containing at least two thiol groups per molecule to provide about 0.6–1.1, or 0.8–0.95, or 0.8–1, or 0.8–1.1 equivalent of polythiol per equivalent of the polyfunctional compound and the polythiol being greater than 4; and (c) 0.05–0.25 part of a photocuring rate accelerator; and (2) incorporating the other essential ingredients of the sprayable photocurable surface coating composition of my invention into the aforesaid composition A as set forth infra.

The following U.S. Patents teaching polyfunctional components (polyenes) containing at least two reactive unsaturated carbon-to-carbon bonds per molecule, polythiol components containing at least two thiol groups per molecule, photocuring rate accelerators and photocuring compositions comprising (or consisting essentially) of admixtures of such polyenes and polythiols with photocuring rate accelerators are incorporated herein be reference:

1. Patent No. 3,615,450, Werber, et al., 96/35.1.
2. Patent No. 3,645,730, Frank, et al., 96/28.
3. Patent No. 3,537,853, Wessells, et al., 96/35.1.
4. Patent No. 3,535,193, Prince, 161/88.
5. Patent No. 3,661,744, Kehr, et al., 204/159.14.
6. Patent No. 3,578,614, Wszolek, 260/13.
7. Patent No. 3,660,088, Lundsager, 96/36.
8. Patent No. 3,662,022, Lard, 260/837 R.
9. Patent No. 3,662,023, Kehr, et al., 260/858.
10. Patent No. 3,700,574, Kehr et al., 204/159.14.

As used herein the term "reactive," as applied to an ethylenically unsaturated carbon-to-carbon bond, means that the ethylenically unsaturated bond will react under proper conditions as set forth herein with thiol groups to yield thioether linkage

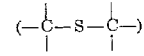

as contrasted to the term "unreactive" carbon-to-carbon unsaturation (i.e., an "unreactive" carbon-to-carbon double bond) which means

groups when found in aromatic nucleii (cyclic structures exemplified by benzene, pyridine, anthracene, tropolone and the like) which does not under the same conditions react with thiols to give a thioether linkage.

It is readily apparent that the hydrocarbyl radical (hydrocarbyl moiety), R, of the polyene used in preparing the composition of this invention is free of peroxide moieties, thiol moities, organometallic moieties, positive halogen moieties, and reactive unsaturated carbon-to-carbon bonds—except the reactive unsaturated carbon-to-carbon bonds present in the pendent groups:

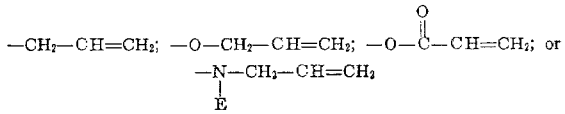

in which E is defined in the above Summary.

It is also readily apparent that said hydrocarbyl moiety (R) can contain cyclic groupings and hetero atoms such as N, S, P or O and that it should generally contain primarily carbon-carbon, carbon-nitrogen, or carbon-oxygen chain linkages.

It is further readily apparent that the hydrocarbyl moiety (hydrocarbyl radical), $R_2$, of the polythiol used in preparing the composition of this invention is free of peroxide moieties, positive halogen moieties, organiometallic moieties, reactive unsaturated carbon-to-carbon bonds, and thiol moieties—except the thiol moieties present in the pendent groups.

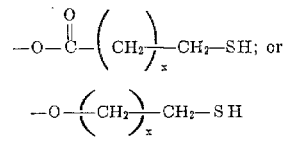

in which $x$ is defined in the above Summary.

It is also readily apparent that said hydrocarbyl radical ($R_2$) can contain cyclic groupings and minor amounts or hetero atoms such as N, S, P or O but primarily contains carbon-carbon, carbon-nitrogen, or carbon-oxygen chain linkages.

Nonionic emulsifiers are well known to those skilled in the art. A large number of such emulsifiers, which can be used with excellent results in preparing the sprayable photocurable surface coating composition of this invention, are described on pages 127–131 of Volume 8 of the Second Edition of the Kirk-othmer "Encyclopedia of Chemical Technology" (1969). The Pluronic surfactants (condensation products of ethylene oxide and polypropylene glycol), especially Pluronic F-88, are preferred emulsifiers for use in preparing the photocurable composition of this invention.

Where preparing a photocurable surface coating composition of the instant invention I have usually followed a procedure comprising:

1. Forming a first mixture by heating 1 part of the aforesaid polyfunctional component (polyene) containing at least two reactive ethylenically unsaturated carbon-to-carbon bonds per molecule to about 80°–90°C. and admixing the heated polyfunctional component with about 0.2–1 part of a nonionic emulsifier preferably having a temperature of about 50°–55°C.

2. Adjusting the temperature of the first mixture to about 80°–90°C. (if it is not already within this temperature range); vigorously agitating (e.g., stirring at a rapid rate) the first mixture and adding hot (ca. 80°–90°C.) water thereto while vigorously agitating the resulting second mixture and maintaining it at about 80°–90°C. The water is added in increments of about 0.1–0.3 or 0.4 part per part of the polyfunctional component until a total of about 1–50 parts of water per part of the polyfunctional component has been added over a period of about 0.5–2 hours.

3. Maintaining the second mixture at about 80°–90°C. and agitating it vigorously while adding about 0.1–2 parts of molten wax (carnauba wax, paraffin wax, or a mixture thereof) per part of the polyfunctional component thereto while vigorously agitating the resulting third mixture and maintaining it at about 80°–90°C.

4. Maintaining the third mixture at about 80°–90°C. and agitating it vigorously while adding the aforesaid polythiol thereto in an amount to provide, in the resulting fourth mixture, about 0.6–1.1, or 0.8–0.95, or 1.1 equivalent of thiol per equivalent of polyfunctional compound or component (i.e., the aforesaid polyene) and continuing to agitate the resulting fourth mixture vigorously while maintaining said fourth mixture of about 80°–90°C.

5. Maintaining the fourth mixture at about 80°–90°C. and agitating it vigorously while adding about 0.1–2 parts of glycerol per part of polyfunctional component thereto and vigorously agitating the resulting fifth mixture while maintaining it at about 80°–90°C.

6. Maintaining the fifth mixture at about 80°–90°C. and agitating it vigorously while adding about 0.1–2 parts of paraffin oil having a specific gravity of about 0.83–0.9 at 20°C. and a viscosity of about 500–1,000 centipoises at 20°C. per part of the polyfunctional component thereto and vigorously agitating the resulting sixth mixture while maintaining it at about 80°–90°C.

7. Maintaining the sixth mixture at about 80°–90°C. and agitating it vigorously while adding about 0.05–0.25 parts of photocuring rate accelerator (said rate accelerator being added in the liquid or molten state) per part of the polyfunctional component thereto while vigorously agitating the resulting seventh mixture (the sprayable photocurable surface coating composition of this invention) and maintaining it at about 80°–90°C.

8. Cooling the seventh mixture to about 20°–30°C. (preferably over a period of about 0.5–2 hours) while continuing to agitate it.

While the above procedure is the preferred method for preparing the photocurable surface coating composition of my invention, it is not the only procedure by which said composition can be prepared. For example; (a) the photocuring rate accelerator can be added as a fine powder (e.g., minus ca. 200 mesh or finer) or it can be dispersed in the water or glycerol and added with the water or glycerol; (b) the polythiol can be added to the system before or after adding the water; (c) if the polyfunctional component (compound) and the polythiol are admixed before the water is added, the polythiol can be admixed into the system before or after the emulsifier is admixed into the system; (d) the emulsifier must be present in the system before the water is added thereto; and (e) the wax can be added; (i) before or after the polythiol; (ii) before or after the paraffin oil; (iii) after admixing it (the wax) with the paraffin oil; or (iv) as solid particles (ca. minus 8 mesh or smaller or somewhat larger).

Various other modifications will, because of my disclosure, be readily apparent to those skilled in the art.

I have found that it is important that the water be added to a mixture comprising at least the polyfunctional compound and the emulsifier rather than; (a) adding the polyfunctional compound and the emulsifier to the water; or (b) adding the polyfunctional compound to a mixture comprising the water and the emulsifier. I have also found that it is important that the mixture to which the water is added contains the emulsifier and that said mixture be agitated vigorously while adding the water thereto.

One skilled in the art can readily determine the degree of agitation which is sufficiently vigorous for the purpose of this invention because the desired emulsion will not form if agitation is not sufficiently vigorous. It is also important that the water be added in relatively small increments (ca. 0.1–0.4 part per part of the polyfunctional component) or at a relatively slow rate because if too much water is added at one time (or if the increments are added too close together or if the water is added too fast) the desired emulsion will not form. Because of my disclosure one skilled in the art can readily determine the proper increment size and the proper period of time between increments. Alternatively, the second mixture can be formed by slowly adding the water as a continuous stream.

Because of my disclosure, it will be readily apparent to those skilled in the art that, after incorporating the photocuring rate accelerator and the polythiol herein the composition must be protected from exposure to sunlight or other actinic radiation because, once the polyfunctional component, the polythiol, and the photocuring rate accelerator are all present in the composition, the composition will cure (polymerize) on exposure to actinic radiation.

Among the polyenes which have been used to prepare the sprayable photocurable composition of this invention are:

1. A triene (designated "T-1") having the formula

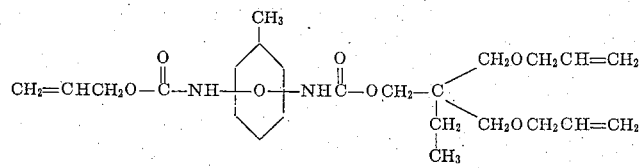

was prepared by admixing and reacting equal molar quantities (e.g., 1 mole of each) of toluene diisocyanate, trimethylol propane diallyl ether, and allyl alcohol. About 0.1 g of dibutyl tin dilaurate was present to catalyze the reaction.

2. o-, m-, and p-diallyl phthalate (all designated "T-2") and mixtures of any two (and all three) of these isomeric phthalates were used to prepare the sprayable photocurable surface coating composition of this invention. In each instance the resulting sprayable coating composition was found to be excellently adapted for protecting metal and wooden surfaces and for use as a furniture polish.

3. A tetraene (designated "T-3") which has the formula

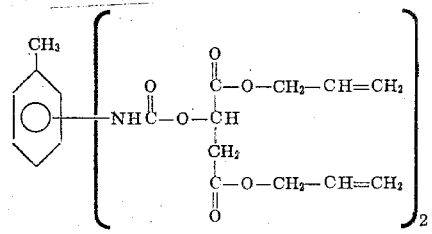

was prepared by; (a) esterifying malic acid with allyl alcohol to form diallyl malate; and (b) reacting 2 moles of the diallyl malate with one mole of toluene diisocyanate. About 0.2 of dibutyl tin dilaurate can be used as catalyst where using 1 mole of toluene diisocyanate.

4. A diene (designated "T-4") which has the formula

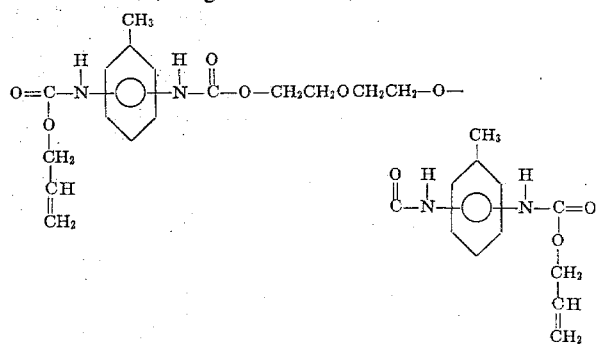

was prepared by admixing and reacting 2 moles of toluene diisocyanate, 1 mole of diethylene glycol and 2 moles of allyl alcohol; about 0.4 g of dibutyl tin dilaurate can be added as catalyst.

5. Other dienes (designated "T-5") and having the formula

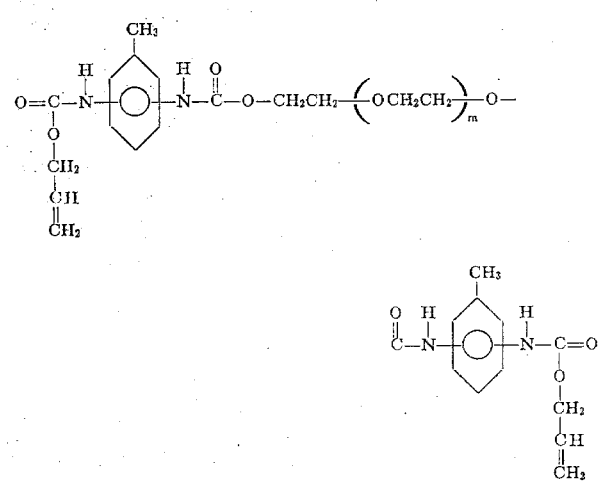

were prepared according to the general procedure used to prepare the diene designated T-4; however, where preparing a diene to be designated T-5, the diethylene glycol used to prepare T-4 was replaced (on a mole for mole basis) with a polyethylene glycol having the formula

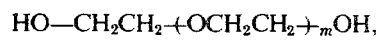

HO—CH$_2$CH$_2$—(OCH$_2$CH$_2$)$_m$OH, in which m is an average number. Runs were made using polyethylene glycols in which "$m$" was 2, 11, 19, and 37.

6. A tetraene (designated "T-6") was prepared by; (a) admixing and reacting 2 moles of 3-isocyanatomethyl-3,5,5-trimethylcyclohexyl-isocyanate (IPDI) and one mole of a polyethylene glycol having an average molecular weight of about 400 to form one mole of intermediate compound having two isocyanate groups per molecule; and (b) admixing and reacting 1 mole of said intermediate and two moles of trimethylol propane diallyl ether to form the tetraene designated T-6. If desired about 0.4 g of dibutyl tin dilaurate can be added to catalyze the reaction between the isocyanate radicals and the hydroxyl groups of; (a) the polyethylene glycol; and (b) the trimethylal propane diallyl ether. This tetraene was used to prepare the photocurable polishing wax of the instant invention. The resulting wax was a polishing wax of excellent quality well adapted for polishing automobile bodies.

7. A tetraene (designated "T-7") was prepared by; (a) admixing and reacting 2 moles of toluene diisocyanate and one mole of di(2-hydroxyethyl)dimethylhydantoin (DHM) to form 1 mole of an intermediate compound having two isocyanate groups (radicals) per molecule; and (b) admixing and reacting 1 mole of said intermediate and two moles of trimethylol propane diallyl ether to form the tetraene designate T-7. If desired, about 0.3–0.4 g of dibutyl tin dilaurate can be used to catalyze reaction of the isocyanate groups with the hydroxyl groups of the DHM and the trimethylol propane diallyl ether.

9. A tetrane (designated "T-8") was prepared according to the general procedure used to prepare the tetraene which was designated T-7. However, in this instance, the procedure was modifying by replacing the 2 moles of toluene diisocyanate which was used to prepare polyene T-7 with 2 moles of the above described IPDI (which was used to prepare the tetraene designated T-6).

9. A triene (designated "T-9") was prepared by admixing 272 g of pentaerythritol and 1,300 g of a 50% sodium hydroxide solution and adding thereto 1,936 g of allyl bromide while maintaining the resulting mixture at 70°–80°C for about 12 hours. The product (T-9) was identified as the triallyl ester of pentaerythritol.

Among the polythiols which have been used to prepare the sprayable photocurable composition of this invention are:

1. Trimethylol propane tris (3-mercaptopropionate) which is designated "P-1."
2. Trimethylol propane tris (2-mercaptoacetate) which is designated "P-2."
3. Pentaerythritol tetrakis ($\beta$-mercaptopropionate) which is designated "P-3."
4. Pentaerythritol tetrakis ($\alpha$-mercaptoacetate) was designated "P-4."
5. Tris(2-hydroxyethyl)isocyanurate tris(3-mercaptopropionate) was designated "P-5;" it was made by the procedure taught by U.S. Pat. No. 3,676,440 (Los, 260/248).

6. Tris(2-hydroxyethyl)isocyanurate tris(2-mercaptoacetate) which was designated "P-6" was prepared by the general procedure used to prepare P-5, but said procedure was modified by replacing the 3-mercaptopropionic acid with 2-mercaptoacetic acid.

7. A polythiol ("P-7") was prepared by; (a) esterifying one of the OH groups of dipentaerythritol (DPE) with stearic acid (or with the acid chloride of stearic acid) to form an intermediate; and (b) then esterifying the remaining 5 OH groups of the intermediate with 3-mercaptopropionic to form polythiol P-7.

8. A polythiol ("P-8") was prepared by; (a) esterifying two of the OH groups of DPE with stearic acid (or the acid chloride thereof) according to the general procedure used to prepare T-7 but modifying said procedure by using with two moles of stearic acid (or its acid chloride) per mole of DPE; and (b) then esterifying the remaining 4 OH groups with 3-mercaptopropionic acid to form polythiol P-8.

9. A polythiol ("P-9") was prepared by the method used to prepare P-8 except that 3 moles of stearic acid (or its acid chloride) and 3 moles of 3-mercaptopropionic acid were used per mole of DPE.

10. A polythiol (designated "P-10") was prepared by the method used to prepare P-8 except that 4 moles of stearic acid (or its acid chloride) and 2 moles of 3-mercaptopropionic acid were used per mole of DPE.

11. A polythiol (designated "P-11") was prepared by the process used to prepare P-7 but modified by replacing the 3-mercaptopropionic acid with 2-mercaptoacetic acid.

12-14. Polythiols (designated "P-12," and "P-13" "P-14") were prepared by the general method used to prepare P-11 except that to prepare; (a) P-12, 2 moles of stearic acid (or its acid chloride) were use; (b) P-13, 3 moles of stearic acid (or its acid chloride) were used; and (c) P-14, 4 moles of stearic acid (or its acid chloride) were used.

15. A polythiol (designated "P-15") was prepared by reacting (esterifying) all 6 OH groups of DPE with 3-mercaptopropionic acid.

16. A polythiol (designated "P-16") was prepared by reacting (esterifying) all 6 OH groups 2-mercaptoacetic acid.

17. A polythiol (designated "P-17") was prepared by reacting bisphenol A with propylene oxide (2 moles of said oxide per mole of bisphenol A) and esterifying the resulting glycol with 3-mercaptopropionic acid.

18. A polythiol (designated "P-18") was prepared by the procedure used to prepare P-17 except that the 3-mercaptopropionic acid was replaced with 2-mercaptoacetic acid.

19. A polythiol (designated "P-19") was prepared by reacting the above-described T-9 with a stoichiometric amount of thiolacetic acid (3moles of said acid per mole of T-9) in the presence of a catalytic amount of t-butyl hydroperoxide. Reaction temperature was about 80°-90°C. The reaction product was admixed with aqueous sodium hydroxide (using 2.5 equivalents of said hydroxide for each equivalent of T-9 feed), refluxed for about 3 hours, cooled and extracted with ether. The product which was recovered from the ether was identified as

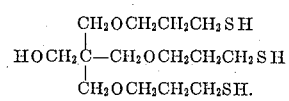

20. A polythiol (designated P-20) was prepared by esterifying ethylene 1 mole of glycol with 2 moles of β-mercaptopropionic acid. Said polythiol had the formula

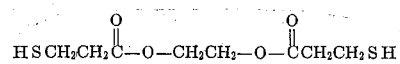

21. A polythiol (designated P-21) was prepared by the general procedure used to prepare the above described polythiol P-20. However, in this run the β-mercaptopropionic acid was replaced with α-mercaptopropionic acid. The resulting polythiol had the formula

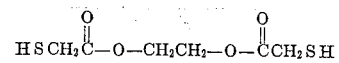

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE 1

A tetraene having the formula

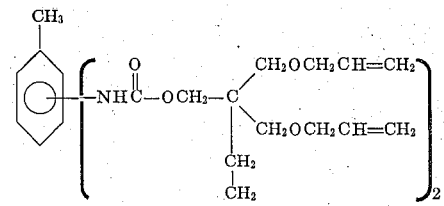

was prepared by admixing 2 moles of trimethylol propane diallyl ether and 0.2 g of dibutyl tin dilaurate catalyst in a resin kettle. The mixture was kept therein under nitrogen. The resin kettle was equipped with a stirrer, thermometer, dropping funnel, and a gas inlet and outlet. 1 mole of toluene diisocyanate was added slowly with stirring and the reaction temperature was maintained at 70°C. by means of a water bath. After addition of the toluene diisocyanate, the reaction continued for about 1 hour at 70°C. until the —NCO content was substantially zero. The thus formed tetra-allyl terminated liquid product was designated "Product 1."

EXAMPLE 2

A diene having the formula

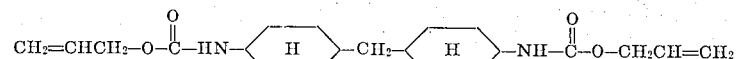

was prepared by reacting allyl alcohol with a stoichiometric quantity of 4,4'-dicyclohexylmethane diisocyanate (2 moles of the alcohol per mole of the diisocyanate) in the presence of 0.2 g of dibutyl tin dilaurate catalyst in a resin kettle while maintaining the reacting mass under an atmosphere of nitrogen. The resulting diene (which was a solid melting at 93°C.) was designated "Product 2."

EXAMPLE 3

A tetraene designated "Product 3" was prepared by the following method:

Five moles of Epon 828 (an epoxy compound, obtained from Shell Chemical Co.) having the formula

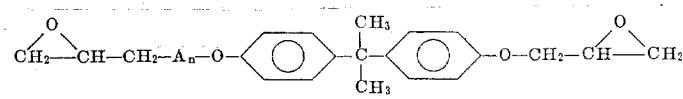

where A is

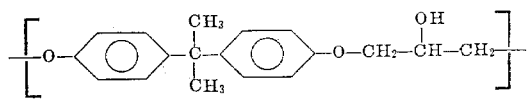

and $n$ is a number greater than 0 and less than 1 and having an average value such that the average molecular weight of the epoxy compound is about 390) and 12 moles of diallylamine were admixed under an atmosphere of nitrogen and maintained at about 80°–90°C. (under said atmosphere of nitrogen) for about 2–3 hours. Then unreacted diallyl amine was distilled off under reduced pressure (ca. 1–10 mm of mercury absolute) and the residue (substantially pure Product 3) was recovered.

EXAMPLE 4

A 100 g portion of Product 1 (the tetraene prepared in Example 1) was heated to about 90°C. and 50 g of Pluronic F88 (a nonionic emulsifier resulting from the action of ethylene oxide and polypropylene glycol) was added thereto to form a first mixture. The first mixture was stirred vigorously and 200 g of water having a temperature of about 90°C. was added thereto in about 20 ml increments over a period of about an hour while vigorously stirring the first mixture and the resulting second mixture and while maintaining the temperature thereof about 90°C. A 100 g portion of a mixture of carnauba wax and paraffin wax (melting at about 55°–60°C.) was added to the second mixture while vigorously stirring the second mixture and the resulting third mixture and while maintaining the temperature thereof at about 90°C. The wax mixture (equal parts by weight of carnauba wax and paraffin wax) was added as a powder passing an eight mesh screen. An 81 g portion of pentaerythritol tetrakis ($\beta$-mercaptopropionate) was added to the third mixture while vigorously stirring the third mixture and the resulting fourth mixture and while maintaining the temperature thereof at about 90°C. An 8 g portion of molten benzophenone (a photocuring rate accelerator) was added to the fourth mixture while vigorously stirring the fourth mixture and the resulting fifth mixture and while maintaining the temperature thereof at about 90°C. A 126 g portion of glycerol (glycerine) was added to the fifth mixture while vigorously stirring the fifth mixture and resulting sixth mixture and while maintaining the temperature thereof at about 90°C. A 90 g portion of paraffin oil (specific gravity about 0.9 at 20°C. and a viscosity of about 750 centipoises at 20°C.) was added to the sixth mixture while vigorously stirring the sixth mixture and the resulting seventh mixture (the sprayable photocurable wax of my invention) while maintaining the temperature thereof at about 90°C. While stirring the seventh mixture it (the seventh mixture) was cooled from about 90°C. to about 25°C. over a period of about 2 hours. The thus formed composition (which was designated "Product 4") was packaged in a light proof container and the container was closed with a light proof closure.

A thin coating of the above described photocurable sprayable composition, Product 4 which was a sprayable polishing wax, was sprayed on the surface of a wooden desk using a convention spraying technique except that the wax was applied and rubbed to form a smooth coating while the desk and spray were protected from sunlight and other actinic radiation.

The coated surface was exposed to a Type R S Sunlamp for about 15 minutes. The lamp was about 3 feet from the surface. This caused the coating which was about 0.1 mil thick (when cured) to cure producing a hard, scratch resistant, transparent finish which on buffing became very glossy.

EXAMPLE 5

The general procedure used to prepare Product 4 was repeated. However, in this instance the procedure was modified by heating the tetraene "Product 1" to 80°C. (rather than to 90°C.) and conducting the subsequent steps at 80°C. rather than at 90°C. The resulting photocurable polishing wax (which was designed "Product 5") when applied by spray to a table top and cured was indistinguishable from the aforesaid Product 4.

EXAMPLE 6

The general procedure used to prepare Product 4 was repeated. However, in this instance the procedure was modified by replacing the tetraene (Product 1) used in Example 4 with the tetraene (Product 2) prepared in Example 2. In this instance 55 g of pentaerythritol tetrakis ($\beta$-mercaptopropionate) was used.

The resulting product (Product 6) was a sprayable photocurable polishing wax of high quality excellently adapted for use as a polishing wax for metal surfaces and wooden surfaces including furniture.

When Product 6 was applied to the surface of a desk from an aerosol spray bomb, cured and polished as in Example 4, supra, the results were indistinguishable from those obtained in Example 4.

EXAMPLE 7

The general procedure of Example 6 was repeated. However, in this instance the pentaerythritol tetrakis ($\beta$-mercaptopropionate) was replaced with 90 g of ethylene glycol ($\beta$-mercaptopropionate).

The resulting product (Product 7) was a sprayable photocurable polishing wax of high quality excellently adapted for use as a polishing wax for metal surfaces and wooden surfaces including furniture.

EXAMPLE 8

The general procedure of Example 4 was repeated. However, in this instance the procedure was modified by replacing the tetraene (Product 1) used in Example 4 with the diene (Product 2) prepared in Example 2. In this instance 64 g of pentaerythritol tetrakis ($\beta$-mercaptopropionate) was used.

The resulting product (Product 8) was a sprayable photocurable polishing wax of high quality excellently adapted for use as a polishing wax for metal surfaces and wooden surfaces including furniture.

In other runs (Runs 1–6 reported below) using the general procedure of Example 3:

1. Product 1 (the polyfunctional component (polyene) containing at least two reactive ethylenically unsaturated carbon-to-carbon bonds per molecule) which was used in Example 4 was replaced with each of the polyfunctional components containing molecules having at least two reactive ethylenically unsaturated carbon-to-carbon bonds per molecule which are taught in the above-mentioned US Patents Nos:
   a. Patent No. 3,615,450, Werber, et al., 96/35.1.
   b. Patent No. 3,645,730, Frank, et al., 96/28.
   c. Patent No. 3,537,853, Wessells, et al., 96/35.1.
   d. Patent No. 3,535,193, Prince, 161/88.
   e. Patent No. 3,661,744, Kehr, et al., 204/159.14.
   f. Patent No. 3,578,614, Wszolek, 260/13.
   g. Patent No. 3,660,088, Lundsager, 961/36.
   h. Patent No. 3,662,022, Lard, 260/837 R.
   i. Patent No. 3,662,023, Kehr, et al., 260/858.
   j. Patent No. 3,700,574, Kehr, et al., 204/159.14.

In each instance care was used to match the polyfunctional component with a polythiol that would assure a total functionality (the functionality of the polyene and the polythiol) greater than 4.

2. The polythiol (pentaerythritol tetrakis ($\beta$-mercaptopropionate) which was used in Example 4 was replaced with each of the polythiol components having molecules containing at least two thiol groups per molecule which are taught in said above-mentioned patents. The polythiol and polyfunctional components were so selected that the total functionality was always greater than 4.

3. The benzophenone (photocuring rate accelerator) used in Example 4 was replaced with the photocuring rate accelerators taught in said above-mentioned US Patents using amounts of photocuring rate accelerator varying from about 0.05 to about 0.25 part of photocuring rate accelerator per part of polyfunctional component containing at least 2 reactive ethylenically or acetylenically unsaturated bonds per molecule.

4. The emulsifier used in Example 4 was replaced with the nonionic emulsifiers listed on pages 128–130 of volume 8 of the Second Edition (1965) of Othmer, "Encyclopedia of Chemical Technology." These runs were made using 0.2, 0.3, 0.6, and 1 part of emulsifier per part of polyfunctional component containing at least two reactive ethylenically or acetylenically unsaturated bonds per molecule.

5. The carnauba wax-paraffin wax mixture used in Example 4 was replaced with; (a) carnauba wax; (b) paraffin wax; and (c) mixtures of 0.1, 0.2, 0.5, 1, 2, 10, and 50 parts of paraffin wax per part of carnauba wax. These runs were made using 0.1, 1 and 2 parts of the wax per part of the polyfunctional component containing at least two ethylenically or acetylenically unsaturated bonds per molecule.

6. The quantity of water was varied using 1, 10, 20, 30, 40, and 50 parts of water per part of the polyfunctional compound containing at least two ethylenically or acetylenically unsaturated bonds per molecule.

In each of the above-mentioned runs the product was a sprayable photocurable polishing wax having a free flowing sprayable consistency which was excellently adapted for polishing metal or wooden surfaces. In each of said runs the equivalent ratio of polyfunctional component containing at least 2 reactive ethylenically or acetylenically unsaturated carbon-to-carbon bonds per molecule to polythiol component was maintained within a range of about 1:0.6–1.1.

EXAMPLE 9

A series of sprayable photocurable surface coating compositions of my invention were made in a series of runs (reported in the following table) using the general procedure of Example 4. However, in the runs of this example said procedure was modified by using, in each respective run, the polyene listed (in said table) for such run and the polythiol listed (in said table) for such run. In each run the total functionality (that of the polyene plus that of the polythiol) was always greater than 4.

In each run a 100 g portion of polyene was used and the quantity of polythiol was so selected that the equivalent ratio of polyene to polythiol was 1:0.6–1.1.

The sprayable photocurable surface coating composition (sprayable photocurable polishing wax) made in each of said runs was found to be an excellent composition for protecting the surface of metal furniture and wooden furniture. Each was an excellent furniture polish where sprayed on a surface, buffed with a soft cloth, and cured. Alternatively, the polish can be buffed after curing.

PPREPARATION OF SPRAYABLE PHOTOCURABLE POLISHING WAX

| Run No | Polyene | Polythiol | Equivalent Ratio of Polyene:Polythiol |
|---|---|---|---|
| 1 | T-1 | P-1 | 1:1 |
| 2 | T-1 | P-2 | 1:0.8 |
| 3 | T-1 | P-3 | 1:0.7 |
| 4 (a) | T-2 (a) | P-4 | 1:0.6 |
| 5 (b) | T-2 (b) | P-5 | 1:1.1 |
| 6 (c) | T-2 (c) | P-5 | 1:0.95 |
| 7 | T-3 | P-6 | 1:0.65 |
| 8 | T-3 | P-10 | 1:0.85 |
| 9 | T-4 | P-6 | 1:1 |
| 10 (d,e) | T-5 (d,e) | P-7 | 1:1 |
| 11 | T-6 | P-7 | 1:1 |
| 12 | T-7 | P-8 | 1:0.7 |
| 13 | T-8 | P-8 | 1:0.7 |
| 14 | T-9 | P-8 | 1:0.75 |
| 15 (f) | T-2 (f) | P-11 | 1:0.6 |
| 16 | T-4 | P-9 | 1:0.65 |
| 17 | T-1 | P-10 | 1:0.6 |
| 18 | T-7 | P-12 | 1:1.1 |
| 19 | T-3 | P-13 | 1:1.05 |
| 20 | T-6 | P-14 | 1:0.8 |
| 21 (f) | T-2 (f) | P-15 | 1:0.7 |
| 22 | T-8 | P-16 | 1:0.9 |
| 23 | T-1 | P-17 | 1:1 |
| 24 | T-1 | P-18 | 1:0.95 |
| 25 | T-4 | P-19 | 1:0.85 |
| 26 | T-1 | P-9 | 1:0.75 |
| 27 | T-1 | P-10 | 1:0.65 |
| 28 (f) | T-2 (f) | P-12 | 1:0.6 |
| 29 | T-8 | P-119 | 1:0.7 |
| 30 | T-9 | P-19 | 1:0.8 |
| 31 (g) | T-2 (g) | P-3 | 1:1 |
| 32 (h) | T-2 (h) | P-15 | 1:1 |
| 33 (i) | T-2 (i) | P-16 | 1:1 |
| 34 | T-7 | P-20 | 1:0.8 |
| 35 | T-8 | P-21 | 1:1 |

(a) The polyene was o-diallyl phthalate.
(b) The polyene was p-diallyl phthalate.
(c) The polyene was m-diallyl phthalate.
(d) In this run (Run No. 10) m was 2. (See the description of polyene

-Continued

PPREPARATION OF SPRAYABLE PHOTOCURABLE POLISHING WAX

| Run No | Polyene | Polythiol | Equivalent Ratio of Polyene:Polythiol |
| --- | --- | --- | --- |

(d) In this run (Run No. 10) m was 2. (See the description of polyene T-5, supra.)
(e) Run 10 was made using a polyene T-5 in which "m" was 2; then replications of this run were made in which the procedure was modified by using T-5 polyenes in which "m" was 2, 11, 19, and 37. In each instance the resulting sprayable photocurable composition was an excellent composition for polishing and protecting the surfaces of metallic and wooden surfaces.
(f) The polyene was a mixture of O-, m-, and p-diallyl phthalate.
(g) The polyene was a mixture of O- and m-diallyl phthalate.
(h) The polyene was a mixture of O- and p-diallyl phthalate.
(i) The polyene was a mixture of m- and p-diallyl phthalate.

Further runs (each preparing the sprayable photocurable coating composition of my invention) were made using the general procedure of Example 4. However, in these runs said procedure was modified by replacing the polyene and polythiol of Example 4 with a polyene and a polythiol selected from the above table. At least one run was made wherein each polyene in said table was matched with each polythiol in said table—except that no run was made wherein a diene was matched with a dithiol. In each run the product was a photocurable composition excellently adapted for coating and polishing furniture including metallic and wooden furniture as well as other painted and non-painted metallic and wooden surfaces.

As used herein the term "polyene" refers to single or complex species of alkenes, solid or liquid at or below 70°C, having a multiplicity of terminal reactive carbon-to-carbon unsaturated functional groups per average molecule. For example, a diene is a polyene that has two reactive carbon-to-carbon double bonds per average molecule.

The term "functionality" as used herein refers to the average number of ene or thiol groups per molecule in the polyene or polythiol, respectively. For example, a triene is a polyene with of three "reactive" carbon-to-carbon unsaturated groups per molecule and thus has a functionality of three. A dithiol is a polythiol with two thiol groups per molecule and thus has a functionality of two. A trithiol has a functionality of three, and a tetrathiol has a functionality of four. A diene has a functionality of two, and a tetraene a functionality of four.

As used herein the term "reactive" as applied to the polyfunctional compound or component (the polyene) containing at least two ethylenically unsaturated carbon-to-carbon bonds per molecule means that the unsaturated carbon-to-carbon bonds will react under the conditions as set forth with thiol groups to yield the thioether linkage

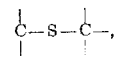

as contrasted to the term unreactive carbon-to-carbon unsaturation which means

groups found in aromatic nuclei (cyclic structures exemplified by benzene, pyridine, anthracene, and the like) which do not under the same conditions react with thiol groups to yield the thioether linkage.

The term "equivalent" as applied to a polythiol means that quantity of the polythiol which contains 33.07 grams of —SH group. Thus, an equivalent of pentaerythritol tetra-beta-mercaptophopionate is ¼ mole of said mercaptopropionate because each molecule of said mercaptopropionate contains 4 —SH groups (i.e., a mole of this compound contains 132.28 grams of —SH).

In a polythiol compound having the formula

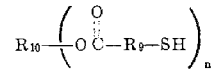

in which $R_{10}$ and $R_9$ are hydrocarbyl moieties (or radicals) an equivalent as ½ mole where $n$ is 2; ⅓ mole where $n$ is 3, ¼ mole where $n$ is 4, and ¼ mole where $n$ is 5.

As noted supra, the term "reactive ethylenically unsaturated group" means a group (having olefinic carbon-to-carbon unsaturation) which will react under proper conditions as set forth herein with thiol groups to yield a thioether linkage

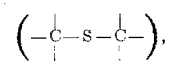

as contrasted to the term "unreactive carbon-to-carbon unsaturation" which means

groups found in aromatic nuclei (cyclic structures exemplified by benzene, pyridine, anthracene, and the like) which do not under the same conditions react with thiols to give thioether linkages.

The term "equivalent" as applied to a compound having reactive olefinic unsaturation means that quantity of the compound which contains one reactive olefinic double bond. Thus, if a compound contains two such bonds an equivalent of said compound is ½ mole of said compound, while an equivalent of a compound containing 3 such bonds is ⅓ mole, and an equivalent of a compound containing 4 such bonds is ¼ mole.

As used herein, the term "percent (%)" means parts per hundred and the term "parts" means parts by weight unless otherwise defined where used.

As used herein, the term "mole" has its generally accepted meaning, that is, a mole of a substance is that quantity of the substance which contains the same number of molecules of the substance as there are atoms of carbon in 12 grams of pure $^{12}C$.

As used herein, the term "g" means gram or grams.

As used herein, the term "A" means Angstrom units.

As used herein, the term "mesh," as applied to screen size, means U.S. standard.

As used herein, the term "ml" means milliliter or milliliters.

As used herein, the term "mil" means 0.001 inch; thus, 10 mils is 0.01 inch and 100 mils is 0.1 inch.

I claim:

1. A sprayable photocurable surface coating composition consisting essentially of a mixture of:

a. 1 part of a polyene having the formula;

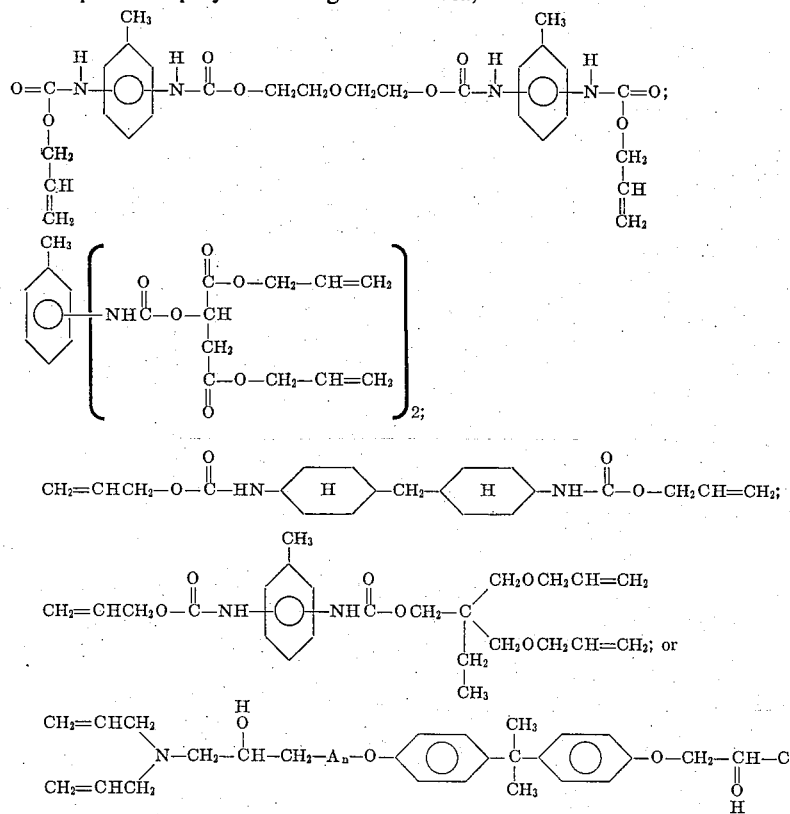

wherein A is

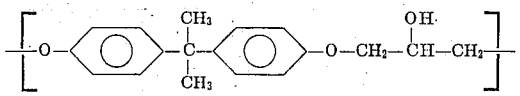

and $n$ has an average value such that the average molecular weight of the polyene is about 584;
  b. about 0.2–1 part of a nonionic emulsifier;
  c. about 0.1–2 parts of a wax selected from the group consisting of carnauba wax, a paraffin wax melting at about 43°–68°C, or a mixture thereof;
  d. about 1–50 parts of water;
  e. about 0.1–2 parts of glycerol;
  f. about 0.1–2 parts of a paraffin oil having a specific gravity of about 0.83–0.9 at 20°C and a viscosity of about 500–1,000 centipoises at 20°C;
  g. a quantity of a liquid polythiol having molecules containing at least two thiol groups per molecule to provide about 0.6–1.1 equivalent of polythiol per equivalent of the polyene, the total functionality of the polyene and the polythiol being greater than 4; and
  h. 0.05–0.25 part of a photocuring rate accelerator.

2. The composition of claim 1 in which the photocuring rate accelerator is selected from the group consisting of an aryl aldehyde, a diaryl ketone, a dialkyl ketone, and alkyl aryl ketone, a triaryl phosphine, and a blend of carbon tetrahalide with a polynuclear aromatic hydrocarbon.

3. The composition of claim 1 in which photocuring rate accelerator is benzophenone.

4. The composition of claim 1 in which polythiol is pentaerythritol tetrakis (β-mercaptopropionate).

5. The composition of claim 1 in which nonionic emulsifier is polyoxypropylene-polyoxyethylene.

6. The composition of claim 1 in which the wax is carnauba wax.

7. The composition of claim 1 in which the wax is paraffin wax.

8. The composition of claim 1 in which the wax is a mixture of carnauba wax and paraffin wax.

9. The composition of claim 1 in which the polyene is

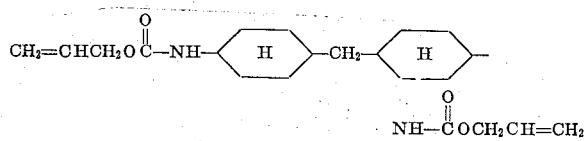

10. The composition of claim 1 in which the polyene is

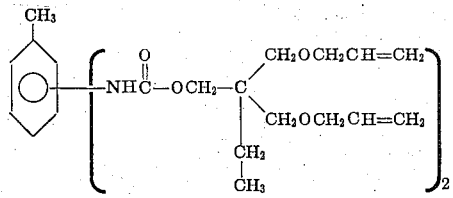

* * * * *